United States Patent
Hoffmann

(10) Patent No.: US 9,448,913 B2
(45) Date of Patent: Sep. 20, 2016

(54) PERFORMANCE METRIC VISUALIZATION SYSTEMS AND METHODS
(71) Applicant: SAP SE, Walldorf (DE)
(72) Inventor: Martin Hoffmann, Heidelberg (DE)
(73) Assignee: SAP SE, Walldorf (DE)
(*) Notice: Subject to any disclaimer, the term of this patent is extended or adjusted under 35 U.S.C. 154(b) by 36 days.
(21) Appl. No.: 14/012,906
(22) Filed: Aug. 28, 2013
(65) Prior Publication Data
US 2015/0067651 A1    Mar. 5, 2015
(51) Int. Cl.
G06F 11/36    (2006.01)
G06F 11/32    (2006.01)
G06F 11/34    (2006.01)
G06F 9/44     (2006.01)
(52) U.S. Cl.
CPC ......... *G06F 11/3612* (2013.01); *G06F 11/323* (2013.01); *G06F 11/3409* (2013.01); *G06F 8/30* (2013.01); *G06F 2201/865* (2013.01)
(58) Field of Classification Search
None
See application file for complete search history.

(56) References Cited

U.S. PATENT DOCUMENTS

| | | | |
|---|---|---|---|
| 7,055,129 B2 | 5/2006 | Ball | |
| 7,272,823 B2 | 9/2007 | Ball | |
| 7,412,349 B2 | 8/2008 | Moser et al. | |
| 7,415,635 B1 | 8/2008 | Annangi | |
| 7,467,263 B2* | 12/2008 | Ozaki et al. | 711/154 |
| 7,516,167 B2* | 4/2009 | Selman et al. | |
| 7,562,344 B1 | 7/2009 | Allen et al. | |
| 7,640,459 B2 | 12/2009 | Ivanov et al. | |
| 7,653,893 B2 | 1/2010 | Neumann et al. | |
| 7,711,670 B2 | 5/2010 | Roediger et al. | |
| 7,802,234 B2 | 9/2010 | Sarukkai et al. | |
| 7,895,565 B1 | 2/2011 | Hudgons et al. | |
| 7,941,789 B2 | 5/2011 | Ivanov et al. | |
| 8,078,590 B2 | 12/2011 | Albert et al. | |
| 8,146,059 B2 | 3/2012 | Ponsford et al. | |
| 8,381,180 B2 | 2/2013 | Rostoker | |
| 8,423,963 B2* | 4/2013 | Garbers | G06F 8/71 717/124 |
| 8,521,502 B2* | 8/2013 | Archer et al. | 703/22 |
| 8,954,996 B2* | 2/2015 | Carvalho de Melo et al. | 719/318 |
| 2002/0156825 A1* | 10/2002 | Hoover, Jr. | G06F 11/323 718/105 |
| 2005/0187986 A1* | 8/2005 | Selman et al. | 707/200 |
| 2007/0283107 A1* | 12/2007 | Ozaki et al. | 711/154 |
| 2008/0307387 A1* | 12/2008 | Yoon | G06F 11/3612 717/110 |
| 2009/0158256 A1* | 6/2009 | Ponsford et al. | 717/125 |
| 2009/0217247 A1* | 8/2009 | Kamigata | G06F 11/3612 717/131 |
| 2010/0094990 A1* | 4/2010 | Ben-Yehuda | G06F 11/3409 709/224 |
| 2010/0235823 A1* | 9/2010 | Garbers | G06F 9/44536 717/170 |
| 2011/0145838 A1* | 6/2011 | de Melo et al. | 719/318 |
| 2011/0288848 A1* | 11/2011 | Archer et al. | 703/21 |
| 2012/0232880 A1* | 9/2012 | Haber | G06F 11/3612 703/22 |
| 2012/0324416 A1 | 12/2012 | Lehner et al. | |
| 2012/0324417 A1* | 12/2012 | Somani | G06F 8/30 717/101 |
| 2013/0152042 A1* | 6/2013 | Bennett | G06F 8/70 717/110 |
| 2014/0380289 A1* | 12/2014 | Kalogeropulos et al. | 717/152 |

* cited by examiner

OTHER PUBLICATIONS

Touati, S-A-A, et al., The Speedup-Test: A Statistical Methodology for Program Speedup Analysis and Computation, 2012, 22 pages, [retrieved on Nov. 14, 2014], Retrieved from the Internet: <URL:https://ec.europa.eu/digital-agenda/events/cf/ictpd14/document.cfm?doc_id=28835>.*
Gao, L., et al., TotalProf: a fast and accurate retargetable source code profiler, Proceedings of the 7th IEEE/ACM international conference on Hardware/software codesign and system synthesis, 2009, pp. 305-314, [retrieved on Jul. 7, 2016], Retrieved from the Internet: <URL:http://dl.acm.org/>.*
Adve, V., et al., An Integrated Compilation and Performance Analysis Environment for Data Parallel Programs, Proceedings of the IEEE/ACM SC95 Conference on Supercomputing, 1995, 18 pages, [retrieved on Jul. 7, 2016], Retrieved from the Internet: <URL:http://ieeexplore.ieee.org/>.*

*Primary Examiner* — Thuy Dao
*Assistant Examiner* — Geoffrey S T Leger
(74) *Attorney, Agent, or Firm* — Brake Hughes Bellermann LLP

(57) ABSTRACT

A method of providing performance metric data includes displaying a set of computer instruction elements using an integrated development environment application executed by a processor, receiving a user selection of at least one of the displayed elements using the integrated development environment application, sending a request for a value of a performance metric associated with the user-selected element from the integrated development environment application to a performance data server, receiving the value of the performance metric from the performance data server, and displaying the value of the performance metric with the set of computer instruction elements using the integrated development environment application.

15 Claims, 4 Drawing Sheets

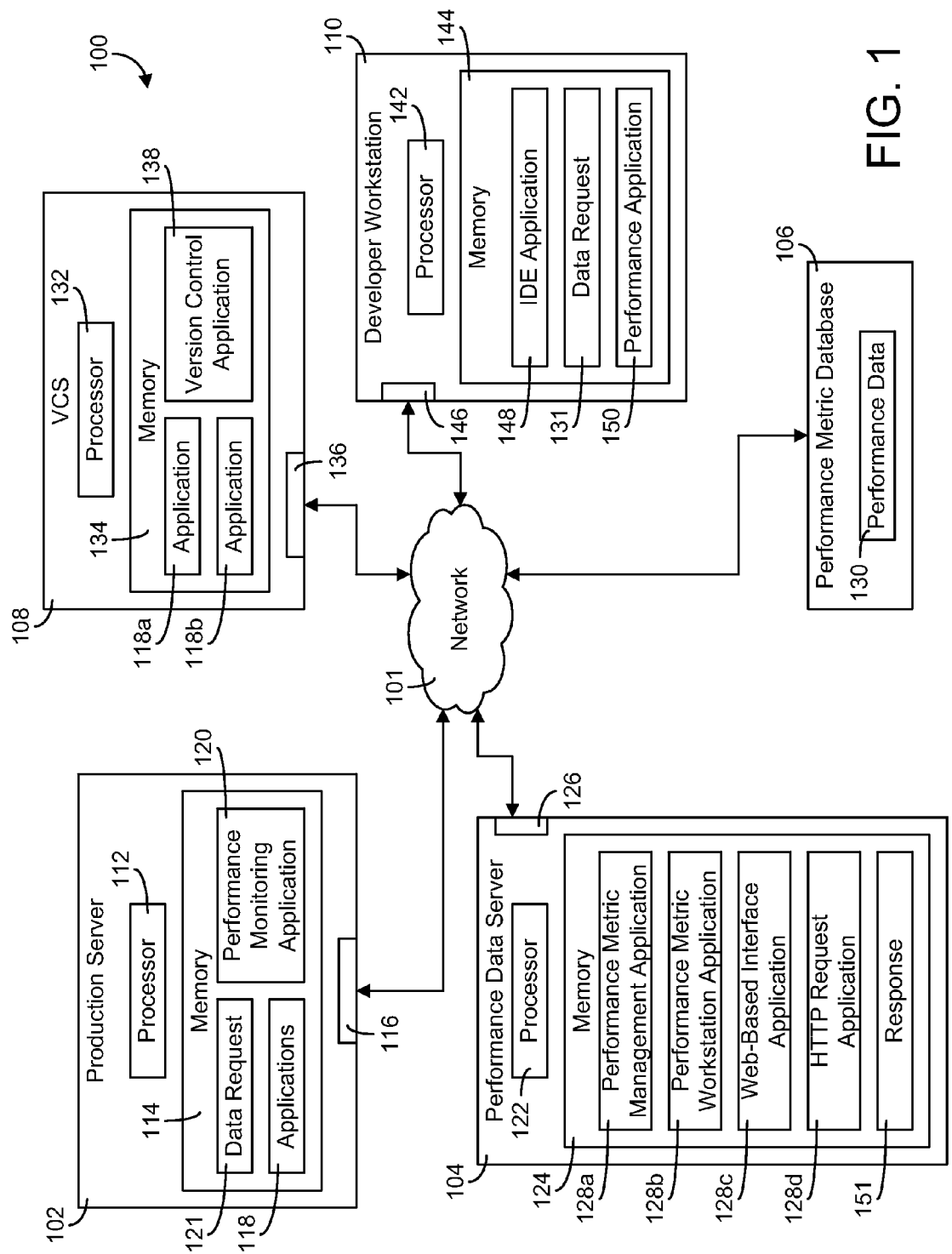

```
TimersProvider.java ✖
169        throw new IllegalArgumentException("Unknown URI " + uri);
170    }
171
172    ContentValues values;
173
174    if (initialValues != null) {
175        values = new ContentValues(initialValues);
176    } else {
177        values = new ContentValues();
178    }
179
180    SQLiteDatabase db = mOpenHelper.getWritableDatabase();
181
182    long rowId = db.insert(TimerTable.TABLE_NAME, null, values);
183
184    //If the insert succeeded, the row ID exists.
185    if (rowID > 0) {
186        Uri timerUri = ContentUris.withAppendedId(TimerTable.CONTENT
    _ID_URI_BASE, rowId);
187        getContext().getContentResolver().notifyChange(timerUri,
    null);
188        return timerUri;
189    }
190
191    Throw new SQLException("Failed to insert row into " + uri);
192 }
```

Outline ✖ db.insert(TimerTable.TABLE_NAME, null, values)

| Metric | Average |
|---|---|
| Execution Time | 30ms |
| CPU Utilization | 20ms |
| Memory Utilization | 300kB |
| Disk I/O | 10kB |

Performance metrics collected from:
ag_prod_collector

FIG. 2

```
TimersProvider.java ✕
169      throw new IllegalArgumentException("Unknown URI " + uri);
170    }
171
172    ContentValues values;
173
174    if (initialValues != null) {
175        values = new ContentValues(initialValues);
176    } else {
177        valu│Exec. Time:  30ms│
178    }    │CPU util.:   20ms│── 308
179         │Mem. alloc:  300kB│
180    SQLiteDat│Disk I/O:    10kB│getWritableDatabase();
181
182    long rowId = db.insert(TimerTable.TABLE_NAME, null, values);
183
184    //If the insert succeeded, the row ID exists.
185    if (rowID > 0) {
186        Uri timerUri = ContentUris.withAppendedId(TimerTable.CONTENT
    _ID_URI_BASE, rowId);
187        getContext().getContentResolver().notifyChange(timerUri,
    null);
188        return timerUri;
189    }
190
191    Throw new SQLException("Failed to insert row into " + uri);
192  }
193
194
195
196
197
198
199
200
201
```

```
Outline ✕
db.insert(TimerTable.TABLE_NAME, null,
          values)
─── Current Version (2013-05-30)
Metric                Average
Execution Time        30ms  (~10ms)
CPU Utilization       20ms  (0ms)
Memory Utilization    300kB (~1MB)
Disk I/O              10kB  (~20kB)

Version (2013-04-12)
Metric                Average
Execution Time        40ms
CPU Utilization       20ms
Memory Utilization    1.3MB
Disk I/O              30kB Performance metrics
collected from:
ag_prod_collector
```

FIG. 3

PERFORMANCE METRIC VISUALIZATION SYSTEMS AND METHODS

BACKGROUND

Current integrated development environments (IDEs) provide a number of components useful to software developers in a convenient package with similar user interfaces. For example, a typical IDE may provide software applications that facilitate source code editing, compiling, and debugging as an integrated unit. Often times, however, in addition to developing and testing software within the IDE, a software developer may need to obtain performance metrics for a particular piece of software. Such performance metrics may include, for example, execution times, CPU utilization times, memory utilization and data volumes. Many current systems may be configured to generate such performance data. For example, in an SAP NETWEAVER software environment having JAVA applications running on an application server, CA WILY INTROSCOPE AGENT application management software may be deployed to collect performance metrics from the various applications and components thereof, the application server, and the surrounding software environment (e.g., using embedded database or profiler traces or software instrumentation points to monitor performance of a particular application). Performance data may then be sent from the production server to a performance data server that uses CA WILY INTROSCOPE ENTERPRISE MANAGER software to store traceable individual performance metrics in a database that may be accessed via, for example, CA WILY INTROSCOPE WORKSTATION software, or a web-based graphical user interface such as CA WILY WEBVIEW software.

Current IDEs, however, lack the capability to leverage the information contained in such databases. For example, a software developer performing routine maintenance tasks may need to determine whether a particular piece of software he or she has written is negatively or positively impacting performance of a software package that has been deployed in a production system. Similarly, a software developer engaged in developing a new application may need to quickly estimate the likely performance impact of the new software in an existing production system. In order to accomplish these tasks, the software developer may need to expend a significant amount of effort outside of the IDE in order to set up and run complex performance tests, and then access and review individual reports regarding database or profiler traces or instrumentation points embedded in the software. As such, there is an ongoing need for improved performance metric visualization systems and methods.

SUMMARY

According to an exemplary embodiment, a method of providing performance metric data includes displaying a set of computer instruction elements using an integrated development environment application executed by a processor, receiving a user selection of at least one of the displayed elements using the integrated development environment application, sending a request for a value of a performance metric associated with the user-selected element from the integrated development environment application to a performance data server, receiving the value of the performance metric from the performance data server, and displaying the value of the performance metric with the set of computer instruction elements using the integrated development environment application.

According to another exemplary embodiment, a system for providing performance metric data in an integrated development environment includes a processor and machine readable storage media having instructions stored therein. The instructions, when executed by the processor, cause the processor to display a set of computer instruction elements in an integrated development environment interface, receive a user selection of at least one of the displayed elements, send a request for a value of a performance metric associated with the user-selected element from the integrated development environment to a performance data server, receive the value of the performance metric from the performance data server, and display the value of the performance metric with the set of computer instruction elements in the integrated development environment interface.

According to another exemplary embodiment, a computer-readable storage medium has machine instructions stored therein. The instructions are executable by a processor to cause the processor to perform operations including displaying a set of computer instruction elements in an integrated development environment interface, receiving a user selection of at least one of the displayed elements, sending a request for a value of a performance metric associated with the user-selected element from the integrated development environment to a performance data server, receiving the value of the performance metric from the performance data server, and displaying the value of the performance metric with the set of computer instruction elements in the integrated development environment interface.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 1 is a block diagram of a performance metric visualization system according to an exemplary embodiment;

FIG. 2 is an illustration of a user interface that may be used for performance metric visualization according to an exemplary embodiment;

FIG. 3 is an illustration of another user interface that may be used for performance metric visualization according to an exemplary embodiment.

Like reference numbers and designations in the various drawings indicate like elements.

DETAILED DESCRIPTION

Figure 4:
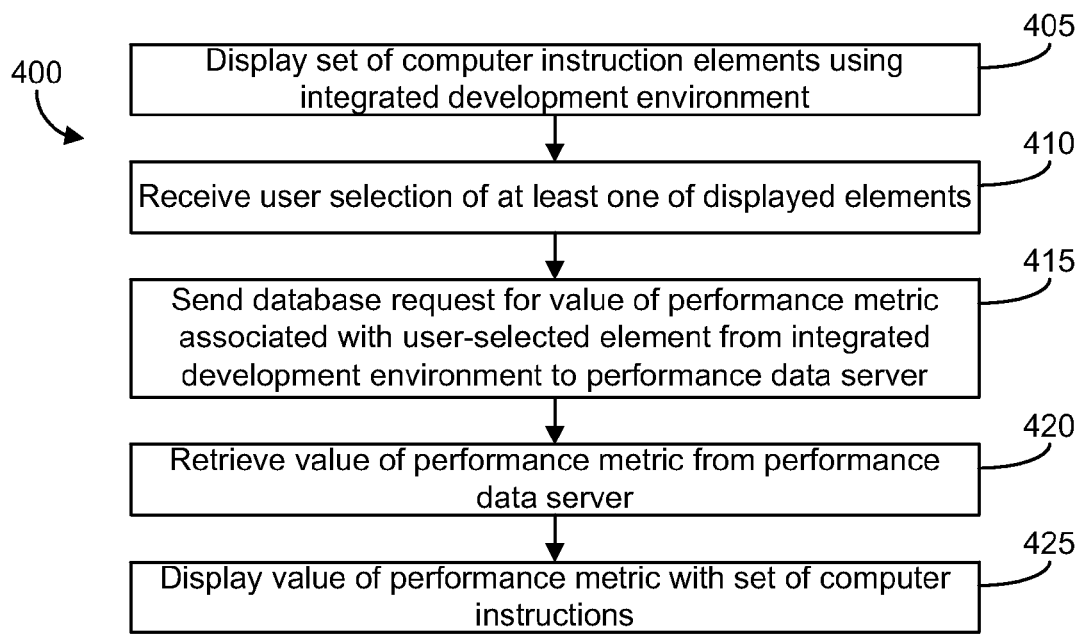
FIG. 4 is a flow diagram of a process for providing performance metric visualization according to an exemplary embodiment.

According to various exemplary embodiments, a performance metric visualization system is configured to provide a user interface that facilitates retrieval and display of performance metric data. A set of computer instruction elements, such as source code, may be displayed using an IDE application. A user may select one or more of the displayed elements using, for example, a cursor controlled by a user input device, such as a mouse or keyboard.

Exemplary computer instruction elements may include, for example, function calls, methods, database statements, hypertext transfer protocol (HTTP) requests, and input/output operations. A data request, such as an HTTP GET request, may be generated to request values of performance metrics associated with the user-selected element from the IDE application. Such performance metrics may include, for example, execution time, central processing unit (CPU) utilization time, memory allocation, and data volume depending on the particular user-selected element. The data request may be sent to a performance data server. The performance data server may retrieve values of the performance metrics by sending a database read request to a performance metric database. The values may be, for example, average values, minimum values, maximum values, and percentage values. The values of the performance metric may be displayed with the set of computer instruction elements using the integrated development environment application. For example, in some embodiments, the values may be displayed in a display area separate from the display area used to display the set of computer instruction elements. In embodiments where the user selection is received via a pointing action placing a cursor over the user-selected element, the value of the performance metric may be displayed proximate to the cursor, such as in a tooltip.

In some embodiments, where the currently displayed user-selected computer instruction element has been released to a production server via a version control system, values of performance metrics for multiple versions of the user-selected computer instruction element, such as the currently displayed version and a prior version, may be received from the performance data server. In some embodiments, the multiple values of the performance metric may each be displayed with the set of computer instruction elements in the IDE along with an indication of the corresponding version. In other embodiments, the difference between values of the performance metric for the multiple versions of the user-selected computer instruction element may be displayed. For example, the difference between values of the performance metric for the currently displayed version and a prior version of the user-selected computer instruction element may be displayed. In some embodiments, an indication of an increase, a decrease, or no change in the value of the performance metric for the multiple versions of the user-selected computer instruction element may be displayed. For example, a positive or negative change in values of the performance metric from a prior version to the currently displayed version of the user-selected computer instruction element may be displayed using color coding or a "+" or "−" indicator.

In some embodiments, where the currently displayed user-selected computer instruction element is being edited or otherwise has not been released to a production server via a version control system, a warning may be displayed indicating that the performance metric database does not contain an updated value of the performance metric for the user-selected element. According to an exemplary embodiment, the performance data server may estimate performance metric values for the unreleased element selected by the user based performance metric values for a computer instruction element other than but similar to the user-selected element, and/or may use a table of estimated values. Where a prior released version of the currently selected but unreleased computer instruction element exists, estimated values of the performance metric for the current version may be displayed with actual performance metric values for the prior version of the user-selected computer instruction element. In some embodiments, the difference between the estimated values of the performance metric for the currently displayed version and the actual values for a prior version of the user-selected computer instruction element may be displayed. In some embodiments, an indication of an increase, a decrease, or no change in the value of the performance metric for the current and prior versions of the user-selected computer instruction element may be displayed.

As will be appreciated, the performance metric visualization systems and methods described in the various exemplary embodiments may allow a software developer performing routine maintenance tasks to determine whether a particular piece of source code he or she has written is negatively or positively impacting performance of a software package that has been deployed in a production system without leaving the IDE. Similarly, a software developer engaged in developing a new application may quickly estimate the likely performance impact of the new software in an existing production system. The software developer may avoid expending significant amounts of effort outside of the IDE in order to set up and run complex performance tests, and then access and review individual reports regarding database or profiler traces or instrumentation points embedded in the software.

FIG. 1 is a block diagram of a performance metric visualization system 100 according to an exemplary embodiment. System 100 may include a network 101 configured to facilitate communication among a production server 102, a performance data server 104, a performance metric database 106, a version control system 108, and a developer workstation 110. System 100 may generally be operated by users at developer workstation 110 to retrieve and display performance data, including values for specific performance metrics, from performance database 106.

Network 101 may be any form of data network that relays information among production server 102, performance data server 104, performance metric database 106, version control system 108, and developer workstation 110. For example, network 101 may include the Internet and/or other types of data networks, such as a local area network (LAN), a wide area network (WAN), a cellular network, satellite network, etc. Network 101 may also include any number of computing devices (e.g., computers, servers, routers, network switches, etc.) that are configured to receive and/or transmit data within network 101. In other words, network 101 may include other devices configured to relay data among production server 102, performance data server 104, performance metric database 106, version control system 108, and developer workstation 110. Network 101 may include any number of hardwired and/or wireless connections, such as WiFi, cellular, radio, Ethernet, fiber optic cable, CAT5 cable, etc.

Production server 102 may be a computing device having a processing circuit that includes a processor 112 configured to execute machine instructions stored in a memory 114. Production server 102 may also include one or more hardware interfaces 116 configured to receive data and/or to communicate data to another device (e.g., to or from a user interface device, to or from network 101, etc.). In some embodiments, production server 102 may be implemented using multiple computing devices. For example, production server 102 may be implemented using multiple servers, one or more data centers, as a cloud computing environment, or the like. In such cases, processor 112 represents the collective set of processors of the devices and memory 114 represents the collective set of data storage devices.

Processor 112 may include one or more microprocessors, application specific integrated circuits (ASICs), circuits containing one or more processing components, a group of distributed processing components, circuitry for supporting a microprocessor, or other hardware configured for processing. According to an exemplary embodiment, processor 112 is configured to execute computer instructions stored in memory 114 to complete and facilitate the activities described herein. Memory 114 can be any volatile or non-volatile computer-readable storage medium capable of storing data or computer code relating to the activities described herein. For example, memory 114 is shown to include application 120 which may be computer instructions (e.g., executable code, object code, source code, script code, machine code, etc.) configured for execution by processor 112 in order to complete the activities described herein.

Hardware interface 116 may include hardware to receive data from a network or serial BUS and to communicate data to another processing circuit via a network or serial BUS. Hardware interface 116 may be configured to receive or transmit data wirelessly (e.g., via radio signals, via infrared signals, etc.) or over a hardwired connection (e.g., a CAT5 cable, a fiber optic cable, etc.). Hardware interface 116 may also communicate data to other devices. In some embodiments, hardware interface 116 may be configured to receive data from, or transmit data to, a user input device (e.g., a display, a mouse or other pointing device, etc.).

In some embodiments, memory 114 may include applications 118. Applications 118 may be, for example JAVA applications configured to be executed in an SAP NETWEAVER software environment. Applications 118 may include computer instruction elements configured to facilitate management of, for example, sales or financial data when executed by processor 112. According to an exemplary embodiment, applications 118 may include one or more embedded database or profiler traces or software instrumentation points to monitor performance of a particular application 118 or particular computer instruction elements thereof. Memory 114 may also include a performance monitoring application 120. Performance monitoring application 120 may be, for example, CA WILY INTROSCOPE AGENT application management software deployed on production server 102 and configured to collect performance data from applications 118 and computer instruction elements thereof using the embedded database or profiler traces or software instrumentation points.

Performance monitoring application 120 may be further configured to send the collected performance data to performance data server 104. In some embodiments, performance monitoring application 120 may be configured to send a data request 121, such as an HTTP "POST" request, to performance data server 104. Data request 121 may include, for example, metadata associated with one or more parameters to identify the particular computer instruction element, as will be described in greater detail below.

Performance data server 104 may be a computing device having a processing circuit that includes a processor 122 configured to execute machine instructions stored in a memory 124. Performance data server 104 may also include one or more hardware interfaces 126 configured to receive data and/or to communicate data to another device (e.g., to or from a user interface device, to or from network 101, etc.). Processor 122, memory 124, and hardware interface 126 may be similar to processor 112, memory 114, and hardware interface 116 respectively. In some embodiments, performance data server 104 may be implemented using multiple computing devices. For example, performance data server 104 may be implemented using multiple servers, one or more data centers, as a cloud computing environment, or the like. In such cases, processor 122 represents the collective set of processors of the devices and memory 124 represents the collective set of data storage devices.

In some embodiments, memory 124 may include applications 128. Applications 128 may include, for example, a performance metric management application 128a such as CA WILY INTROSCOPE ENTERPRISE MANAGER software configured to store and retrieve performance data 130 in performance metric database 106. Applications 128 may also include a performance metric workstation application 128b, such as CA WILY INTROSCOPE WORKSTATION software, or a web-based interface application 128c, such as CA WILY WEBVIEW software.

According to an exemplary embodiment, memory 124 may include an application 128d configured to manage database requests related to storage and retrieval of performance data 130. For example, application 128d may be configured to execute database write requests in response to data requests 121 received from production server 102 in order to store performance data entries 130 in performance metric database 106 for a particular computer instruction element in an application 118. Performance data server 104 may also generate a timestamp for each performance data entry 130 created in response to a data request 121.

Application 128d may also be configured to execute database read requests in response to data requests 131, such as HTTP "GET" requests, received from, for example, developer workstation 110 in order to retrieve performance data 130 from performance metric database 106 for a particular computer instruction element in an application 118. Data requests 131 may include, for example, metadata associated with one or more parameters to identify the particular computer instruction element, as will be described in greater detail below. Application 128d may be configured to generate database read requests in order to retrieve and aggregate performance data entries 130 contained in performance metric database 106 corresponding to the particular computer instruction element based on the parameters specified in data request 131.

In some embodiments, application 128d may be configured to retrieve and aggregate performance data entries 130 contained in performance metric database 106 that directly correspond to the particular computer instruction element based on parameters specified in data request 131 (e.g., where the associated computer instruction element has been released to production server 102 such that performance data 130 is available in performance metric database 106). In some embodiments, application 128d may be further configured to retrieve and aggregate performance data entries 130 contained in performance metric database 106 that do not directly correspond to the particular computer instruction element, but are similar in some manners based on parameters specified in data request 131 (e.g., where the corresponding computer instruction element has not been released to production server 102 such that performance data 130 is not yet available in performance metric database 106). In some embodiments, application 128d may be further configured to retrieve and aggregate performance data entries 130 contained in a table of estimated performance values based on parameters specified in data request 131 (e.g., where the corresponding computer instruction element has not been released to production server 102 such that performance data 130 is not yet available in performance metric database 106).

Performance metric database 106 may be any volatile or non-volatile computer-readable storage medium capable of storing data or computer code relating to the activities described herein. While performance metric database 106 is shown as a separate device in FIG. 1, in some embodiments, performance metric database may be integrated with performance data server 104 as a single unit.

Performance database 106 may be configured to store performance data 130. Performance data 130 may be values for performance metrics associated with computer code instruction elements included in, for example, applications 118. Exemplary computer instruction elements for which performance data may be collected may include, for example, function calls, methods, database statements, hypertext transfer protocol requests, and input/output operations. Exemplary types of performance metrics 130 may include, for example, execution times, CPU utilization times, memory allocation, and data volumes depending on the particular computer instruction element. Exemplary values for individual performance metrics may include, for example, average values, minimum values, maximum values, and percentage values.

Performance database 106 may be configured to store performance data 130 in a structured format based on parameters associated with the particular computer instruction element. The structured format may be, for example, XML format or another structured data format that allows metadata to be associated with values for particular parameters. In some embodiments, performance data 130 may be stored in a relational database within performance database 106 in a format wherein metadata is associated with values for a particular parameter. For example, certain parameter values may correspond to table names, column names, or row names of a relational database configured to store performance data. The metadata may be descriptive metadata (e.g., indicative of the type of data) and/or structural metadata (e.g., metadata that controls how the parameters are related or organized). The metadata may be interrelated, thereby forming a data structure, and/or may be used to organize and classify other metadata objects. The metadata may be used by performance data server 104 to store, retrieve, and aggregate data from performance database 106 in response to data queries or requests, such as data requests 121 and data requests 131.

For example, in some embodiments, performance data 130 may be collected for applications 118 including computer instruction elements coded in JAVA. In such embodiments, performance data 130 associated with a particular computer instruction element may be stored in performance database 106 based on metadata associated with a parameter for the type of computer instruction element, such as a "method", an "http request", or a "database statement". Performance data 130 associated with a particular computer instruction element may also be stored in performance database 106 based on a "calling class", "calling method", and "calling line number". The calling class, calling method, and calling line number may be used to identify the unique location from which the particular computer instruction element is called or referenced. If the particular type of computer instruction element is a method, performance data 130 associated with the particular computer instruction element may also be stored in performance database 106 based on "called class", "called method", and "called line number" parameters. The called class, called method, and line number may be used to identify the unique location of the method being called. For other types of computer instruction elements, other parameters may be applicable as well.

Performance data 130 associated with a particular computer instruction element may also be stored in performance database 106 based on metadata associated with a parameter indicating a particular production server 102. For example, the particular computer instruction element may be deployed on multiple production servers 102, each of which may be configured to send performance data 130 to performance metric database 106 via performance data server 104. Performance data 130 associated with a particular computer instruction element may also be stored in performance database 106 based on metadata associated with a parameter for a particular version. For example, the particular computer instruction element may have been previously deployed on production server 102 in multiple versions, and production server 102 may have been configured to send performance data 130 to performance metric database 106 via performance data server 104 for each version.

Version control system 108 may be a computing device having a processing circuit that includes a processor 132 configured to execute machine instructions stored in a memory 134. Version control system 108 may also include one or more hardware interfaces 136 configured to receive data and/or to communicate data to another device (e.g., to or from a user interface device, to or from network 101, etc.). Processor 132, memory 134, and hardware interface 136 may be similar to processors 112 and 122, memory 114 and 124, and hardware interfaces 116 and 126 respectively. In some embodiments, version control system 108 may be implemented using multiple computing devices. For example, version control system 108 may be implemented using multiple servers, one or more data centers, as a cloud computing environment, or the like. In such cases, processor 132 represents the collective set of processors of the devices and memory 134 represents the collective set of data storage devices. In other embodiments, version control system 108 may be integrated into another system component, such as developer workstation 110.

In some embodiments, memory 134 may include version control application 138. Version control application 138 may be, for example, version control software configured to organize, track and provide control over changes made to applications 118 stored in memory 134. For example, version control application 138 may receive and store edits to various computer instruction elements in applications 118 received from developer workstation 110 as versions 118a and 118b. Version control application 138 may further be configured to manage deployment of various versions of applications 118 to, for example, production server 102. For example, in some embodiments, versions 118a and 118b may be sequentially deployed to production server 102 over a period of time, with, for example, a current version 118b replacing a prior version 118a. In some embodiments, versions 118a and 118b may be spatially deployed to various production servers 102 such that version 118a and 118b are run on different instances of production server 102.

Developer workstation 110 may be any number of different types of electronic devices configured to communicate via network 101. For example, developer workstation 110 may be a desktop computer (e.g., a computing device intended to remain stationary during use). In another example, developer workstation 110 may be a mobile device (e.g., a computing device which can be moved during use such as a tablet computing device, a laptop computer, or the like). Developer workstation 110 may include a processor 142, a memory 144, and a hardware interface 146. Processor 142, memory 144, and hardware interface 146 may be similar to processors 112, 122 and 132, memory 114, 124 and 134, and hardware interfaces 116, 126 and 136 respectively. Interface 146 of developer workstation 110 may receive input data from a pointing device, such as a mouse, as well as input from a keyboard. Developer workstation 110 may also include one or more electronic displays.

In some embodiments, memory 144 may include IDE application 148. IDE application 148 may be, for example, an application such as ECLIPSE software configured to facilitate computer instruction editing, compiling, and debugging as a customizable integrated unit. For example, a user of developer workstation 110 may use IDE application 148 to retrieve a current version of application 118 (e.g., application 118b) from version control system 108 and display the various computer instruction elements contained therein in order to review or edit the instructions.

According to an exemplary embodiment, IDE application 148 may be further configured to facilitate retrieval of performance metric data from performance metric database 106 via performance data server 104 for computer instruction elements contained in an application 118. For example, IDE application 148 may include a performance metric application 150, such as a "plug-in" application or embedded instructions within IDE application 148, configured to provide a customized graphical user interface. The graphical user interface may allow a user of developer workstation 110 to display a set of computer instruction elements contained in application 118. The user may further select one or more of the displayed elements using, for example, a cursor controlled by a user interface device, such as a mouse or keyboard.

The user may select one or more of the displayed elements via a user interface device in any number of different ways. In some embodiments, one or more displayed elements may be selected in response to a swiping motion being performed using a user interface device. For example, one or more displayed elements may be selected in response to a user swiping a cursor over the displayed element (e.g., the user may select the displayed element by keeping a mouse button depressed while moving the cursor controlled by the mouse over the displayed element). In other embodiments, the displayed element may be selected by a user interface device in response to a pointing action (e.g., a mouse button being depressed while its corresponding cursor is positioned over the displayed element).

Performance application 150 may also be configured to generate a data request 131 for values of one or more performance metrics associated with the user-selected computer instruction element, and to send data request 131 to performance data server 104. Data request 131 may be, for example, an HTTP "GET" request based on the text of the user-selected computer instruction element. In some embodiments, performance application 150 may associate the text of the user-selected computer instruction element with metadata that describes the user-selected computer instruction element and/or defines a data structure for the user-selected computer instruction element. Such metadata may be included in data request 131.

By way of example, FIG. 2 is an illustration of a user interface 200 that may be used for performance metric visualization according to an exemplary embodiment. As shown in FIG. 2, the text of various computer instruction elements included in a JAVA application 202 having a Calling Class "TimersProvider" is displayed in a window 203 on the left side of user interface 200. A cursor 204 has been placed over the computer instruction element "db.insert" (e.g., the user selected the displayed element by keeping a mouse button depressed while moving the cursor controlled by the mouse over the displayed element). The user-selected element "db.insert" is of the type "method". Accordingly, the user-selected method "db.insert" may have an associated calling class "TimersProvider", an associated calling method "createTimer", and an associated calling line number "182". The user-selected method "db.insert" may also have an associated called class "DBAdapter", an associated called method "insert", and an associated called line number "380". As such, a database read request for the user selected method "db.insert" may contain the following metadata values: Calling Class="TimersProvider"; Calling Method="createTimer"; Calling Line Number="182"; Called Class="DBAdapter"; Called Method="insert"; and Called Line Number="380".

Referring again to FIG. 1, performance application 150 may receive a response 151 to data request 131 from performance data server 104. Response 151 may include performance data values retrieved and aggregated from performance data entries 130 contained in performance metric database 106. The performance data values may correspond to the particular computer instruction element based on, for example, metadata associated with the parameters specified in data request 131.

For example, according to an exemplary embodiment, application 118b may be a current version of application 118 that has been released to production server 102 such that performance data 130 is available in performance metric database 106. A user of developer workstation 110 may access and display application 118b to, for example, perform maintenance tasks. In this embodiment, response 151 may include performance data values retrieved and aggregated from performance data entries 130 contained in performance metric database 106 that directly correspond to a particular user-selected computer instruction element based on parameters specified in data request 131. Performance application 150 may display the values of the performance metrics contained in response 151 along with the set of computer instruction elements for application 118b using the integrated development environment application.

In some embodiments, the performance metric values may be displayed in a display area separate from the display area used to display the set of computer instruction elements. By way of example, referring again to FIG. 2, performance metric values 206 are displayed in a window 208 on the right hand side of user interface 200 separate from the text of various computer instruction elements included in a JAVA application 202. The displayed performance metric values include an average execution time value 206a, an average CPU utilization time 206b, an average memory utilization 206c, and an average disk I/O 206d. The particular production server or servers from which the performance metrics were provided may be indicated by, for example, a statement 210.

In some embodiments where the user selected computer instruction element is received via a pointing action placing a cursor over the user-selected element, the performance metric values may be displayed proximate to the cursor, such as in a tooltip. By way of example, FIG. 3 is an illustration of a user interface 300 that may be used for performance metric visualization according to an exemplary embodiment. As shown in FIG. 3, the text of various computer instruction elements included in a JAVA application 302 entitled "TimersProvider" is displayed in a window 303 on the left side of user interface 300. A cursor 304 has been placed over the computer instruction element "db.insert" (e.g., the user selected the displayed element by keeping a mouse button depressed while moving the cursor controlled by the mouse over the displayed element). Performance metric values 306 are displayed in a tooltip 308 on the right hand side of user interface 300 proximate to cursor 304.

Referring again to FIG. 1, in some embodiments, application 118b may be a current version of application 118 that has been released to production server 102, and application 118a may be a prior version of application 118 that has also been released to production server 102 such that performance data 130 for both versions of application 118 is available in performance metric database 106. A user of developer workstation 110 may access and display application 118b to, for example, compare performance against prior version 118a. In this embodiment, response 151 may include performance data values retrieved and aggregated for both versions 118b and 118a from performance data entries 130 contained in performance metric database 106. The performance data values may directly correspond to a particular user-selected computer instruction element based on parameters specified in data request 131. Performance application 150 may display the values of the performance metrics contained in response 151 for both versions 118a and 118b along with the set of computer instruction elements for application 118b using the integrated development environment application.

By way of example, referring again to FIG. 3, performance metric values 306 for the current version of JAVA application 302 are shown displayed in a window 310 on the right hand side of user interface 300 separate from the text of various computer instruction elements included in JAVA application 302. The current version number may also be indicated by, for example, a statement 312. Performance metric values 314 for a prior version of JAVA application 302 are shown displayed below performance metric values 306. The prior version number may also be indicated by, for example, a statement 316. The particular production server or servers from which the performance metrics were provided may be indicated by, for example, a statement 318.

In some embodiments, the differences between values of the performance metric for the multiple versions of the user-selected computer instruction element may be displayed. For example, as shown in FIG. 3, the differences 320 between the performance metric values 306 for the currently displayed version and the performance metric values 314 for the prior version of the user-selected computer instruction element are displayed in parentheses next to the performance metric values 306 for the current version. In some embodiments, an indication of an increase, a decrease, or no change in the value of the performance metric for the multiple versions of the user-selected computer instruction element may be displayed. A positive or negative change in values of the performance metric from a prior version to the currently displayed version of the user-selected computer instruction element may be displayed using, for example, color coding (e.g., green for an improvement in performance, red for a decrease in performance, and black for no change in performance) or a "+" or "−" indicator (the absence of which may indicate no change in performance). For example, as shown in FIG. 3, a minus symbol is placed next to the differences 320 in parentheses to indicate a reduction in average execution time of 10 milliseconds, a reduction in average memory utilization of 1 MB, and a reduction in average disk I/O of 20 kB. The absence of an indicator next to the difference 320 for average CPU performance indicates no change in performance.

Referring again to FIG. 1, in some embodiments, application 118b may be a current version of application 118 that has not yet been released to production server 102 such that performance data 130 is not available in performance metric database 106. A user of developer workstation 110 may be, for example, creating or editing version 118b. In this embodiment, response 151 may include performance data values retrieved and aggregated from performance data entries 130 contained in performance metric database 106 that do not directly correspond to a particular user-selected computer instruction element but are similar in some manners based on parameters specified in data request 131. In some embodiments, response 151 may be configured to retrieve and aggregate performance data entries 130 contained in a table of estimated performance values based on parameters specified in data request 131.

In embodiments where performance data 130 is not available in performance metric database 106, the performance data values in response 151 may be much less accurate and may be understood to reflect estimates or "rule-of-thumb" values. By way of example, referring again to FIG. 2, in embodiments where the current version of application 202 has not yet been released to a production server (e.g., the current version is the first version), performance metric values 206 may be estimated values for the performance of method "db.insert". In some embodiments, a warning may also be displayed to a user operating developer workstation 110 indicating that performance metrics may have changed or may not be available. Similarly, referring again to FIG. 3, in embodiments where the current version of application 302 has not yet been released to a production server, but performance data is available for a prior version of application 302 (e.g., the current version represents edits made to the prior version that have not yet been released), performance metric values 306 may be estimated values for the performance of the current version of method "db.insert", while performance metric values 314 represent actual values of a prior version. Accordingly, differences 320 may represent an estimated reduction in average execution time of 10 milliseconds, an estimated reduction in average memory utilization of 1 MB, and an estimated reduction in average disk I/O of 20 kB. The absence of an indicator next to the difference 320 for average CPU performance indicates an estimation that no change in performance will occur.

FIG. 4 is a flow diagram of a process 400 for providing performance metric visualization according to an exemplary embodiment. At a step 405, a set of computer instruction elements, such as source code, may be displayed using an IDE application. At a step 410, a user selection of one or more of the displayed elements may be received. The user selection may be made using, for example, a cursor controlled by a user input device, such as a mouse or keyboard. Exemplary computer instruction elements may include, for example, function calls, methods, database statements, hypertext transfer protocol requests, and input/output operations.

At a step 415, a data request, such as an HTTP request, may be generated and sent to a performance data server in order to request values of performance metrics associated with the user-selected element from the IDE application. Such performance metrics may include, for example, execution time, CPU utilization time, memory allocation, and data volume depending on the particular user-selected element. At a step 420, the values of the performance metrics may be received from the performance data server in response to the data request. The values may be, for example, average values, minimum values, maximum values, and percentage values.

At a step 425, the values of the performance metric may be displayed with the set of computer instruction elements using the integrated development environment application. For example, in some embodiments, the values may be displayed in a display area separate from the display area used to display the set of computer instruction elements. In embodiments where the user selection is received via a pointing action placing a cursor over the user-selected element, the value of the performance metric may be displayed proximate to the cursor, such as in a tooltip.

In some embodiments, where the currently displayed user-selected computer instruction element has been released to a production server via a version control system, values of performance metrics for multiple versions of the user-selected computer instruction element, such as the currently displayed version and a prior version, may be received from the performance data server at step 420. In some embodiments, the multiple values of the performance metric may each be displayed with the set of computer instruction elements in the IDE along with an indication of the corresponding version at step 425. In other embodiments, the difference between values of the performance metric for the multiple versions of the user-selected computer instruction element may be displayed at step 425. For example, the difference between values of the performance metric for the currently displayed version and a prior version of the user-selected computer instruction element may be displayed. In some embodiments, an indication of an increase, a decrease, or no change in the value of the performance metric for the multiple versions of the user-selected computer instruction element may be displayed at step 425. For example, a positive or negative change value of the performance metric from a prior version to the currently displayed version of the user-selected computer instruction element may be displayed using color coding or a "+" or "−" indicator.

In some embodiments, where the currently displayed user-selected computer instruction element is being edited or otherwise has not been released to a production server via a version control system, a warning may be displayed at, for example, step 425 indicating that the performance metric database does not contain an updated value of the performance metric for the user-selected element. According to an exemplary embodiment, the performance data server may estimate performance metric values for the unreleased element selected by the user based performance metric values for a computer instruction element other than but similar to the user-selected element, and/or may use a table of estimated values. Where a prior released version of the currently selected but unreleased computer instruction element exists, estimated values of the performance metric for the current version may be displayed with actual performance metric values for the prior version of the user-selected computer instruction element at step 425. In some embodiments, the difference between the estimated values of the performance metric for the currently displayed version and the actual values for a prior version of the user-selected computer instruction element may be displayed at step 425. In some embodiments, an indication of an increase, a decrease, or no change in the value of the performance metric for the current and prior versions of the user-selected computer instruction element may be displayed at step 425.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client" or "server" include all kinds of apparatus, devices, and machines for processing data, including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, cloud computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of providing performance metric data comprising:
   displaying a set of computer instruction elements of a current version of an application using an integrated development environment application executed by a processor;
   receiving a user selection of at least one of the displayed computer instruction elements of the set of computer instruction elements using the integrated development environment application;
   sending to a performance data server a request for a value of a first performance metric associated with the user-selected computer instruction element, wherein the first performance metric value relates to the performance of the user-selected computer instruction element executing in a production environment and wherein the request contains parameters describing a type of the user-selected computer instruction element and a data structure associated with the user-selected computer instruction element;
   receiving a first value representing an estimate for the first performance metric for the user-selected computer instruction element executing in the production environment for the current version of the application, the estimate being based on a second performance metric associated with a corresponding computer instruction element matching the parameters of the request, wherein the corresponding computer instruction element is different than the user-selected computer instruction element;
   receiving, from the performance data server, a second value for the first performance metric for a prior version of the application; and
   displaying the first value and the second value of the performance metric with the user-selected computer instruction element using the integrated development environment application with a warning that a value for the first performance metric for the current version of the application is not available.

2. The method of claim 1, wherein the user selected computer instruction element has been released to a production server via a version control system.

3. The method of claim 1, wherein displaying the first value and the second value of the first performance metric with the user-selected computer instruction element includes displaying the first value for the current version of the application and the second value with an indicator for the prior version of the application.

4. The method of claim 1, further comprising displaying a difference between the first value and the second value.

5. The method of claim 1, further comprising displaying an indication of one of an increase, a decrease, or no change in the second value relative to the first value.

6. The method of claim 1, wherein the user-selected computer instruction element has not been released for the current version of the application to a production server via a version control system.

7. The method of claim 6, further comprising displaying a warning that a performance metric database does not contain an updated value for the first performance metric for the user-selected computer instruction element for the current version of the application.

8. A system for providing performance metric data in an integrated development environment comprising:
   a processor; and
   machine readable storage media having instructions stored therein that, when executed by the processor, cause the processor to:
      display a set of computer instruction elements of a current version of an application in an integrated development environment interface;
      receive a user selection of at least one of the computer instruction elements of the displayed set of computer instruction elements;
      send to a performance data server a request for a value of a first performance metric associated with the user-selected computer instruction element, wherein the first performance metric value relates to the performance of the user-selected computer instruction element executing in a production environment, and wherein the request comprises parameters describing a type of the user-selected computer instruction element and a data structure associated with the user-selected computer instruction element;
      receive a first value representing an estimate for the first performance metric for the user-selected computer instruction element executing in the production environment for the current version of the application, wherein the estimate is based on a second performance metric associated with a corresponding computer instruction element matching the parameters of the request, the corresponding computer instruction being different than the user-selected computer instruction element
      receive a second value for the first performance metric for a prior version of the application, based on the parameters of the request
      display the first value and the second value of the performance metric with the user-selected computer instruction element in the integrated development environment interface; and,
      displaying a warning that a performance metric database does not contain an updated value for the first performance metric for the user-selected computer instruction element for the current version of the application.

9. The system of claim 8, wherein the instructions are configured to cause the processor to display the first value and the second value in a display area separate from a display area used to display the user-selected computer instruction element.

10. The system of claim 8, wherein the user selection is received via a pointing action placing a cursor over the user-selected computer instruction element, and wherein the instructions are configured to cause the processor to display one of the first value or the second value proximate to the cursor.

11. The system of claim 8, wherein the first value and the second value are one of an average value, a minimum value, a maximum value, or a percentage.

12. The system of claim 8, wherein the set of computer instruction elements includes at least one of a function call, a method, a database statement, a hypertext transfer protocol request, or an input/output operation.

13. The system of claim 8, wherein the first performance metric is one of an execution time, a central processing unit utilization time, a memory allocation, or a data volume.

14. The system of claim 8, wherein sending the request includes generating a hypertext transfer protocol request.

15. A non-transitory computer-readable storage medium having machine instructions stored therein, the machine instructions being executable by a processor to cause the processor to perform operations comprising:

displaying a set of computer instruction elements of a current version of an application in an integrated development environment interface;

receiving a user selection of at least one of the displayed computer instruction elements of the set of computer instruction elements;

sending to a performance data server a request for a value of a first performance metric associated with the user-selected computer instruction element, wherein the first performance metric value relates to the performance of the user-selected computer instruction element executing in a production environment, wherein the request contains parameters describing a type of the user-selected computer instruction element and a data structure associated with the user-selected computer instruction element;

receiving a first value representing an estimate for the first performance metric for the user-selected computer instruction element executing in the production environment for the current version of the application wherein the estimate is based on a second performance metric associated with a corresponding computer instruction element matching the parameters of the request, wherein the corresponding computer instruction element is different than the user-selected computer instruction element;

receiving a second value for the first performance metric for the user-selected element of a prior version of the application displaying the first value and the second value of the performance metric with the user-selected element; and displaying a warning that an updated value for the first performance metric for the user-selected computer instruction element for the current version of the application is not available.

\* \* \* \* \*